INVENTOR.
JAMES T. MATSUOKA

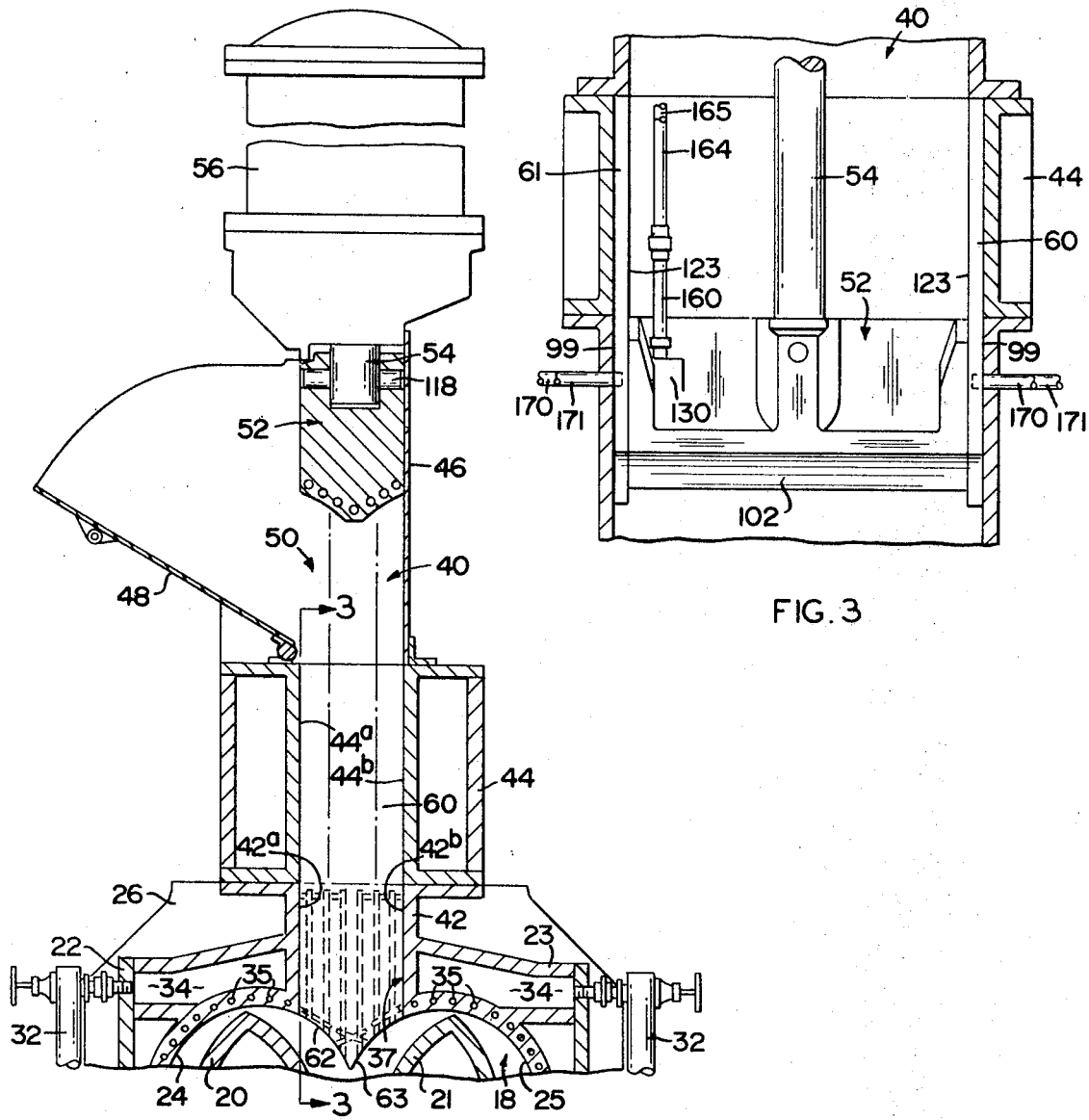

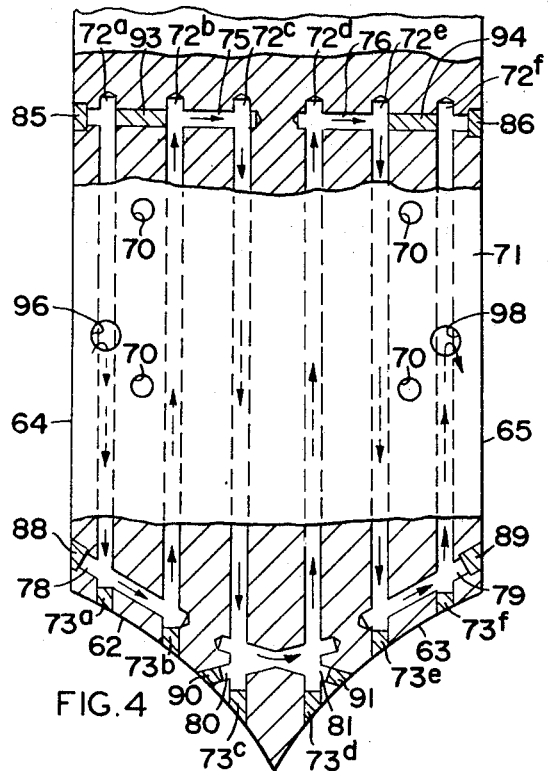
FIG. 4
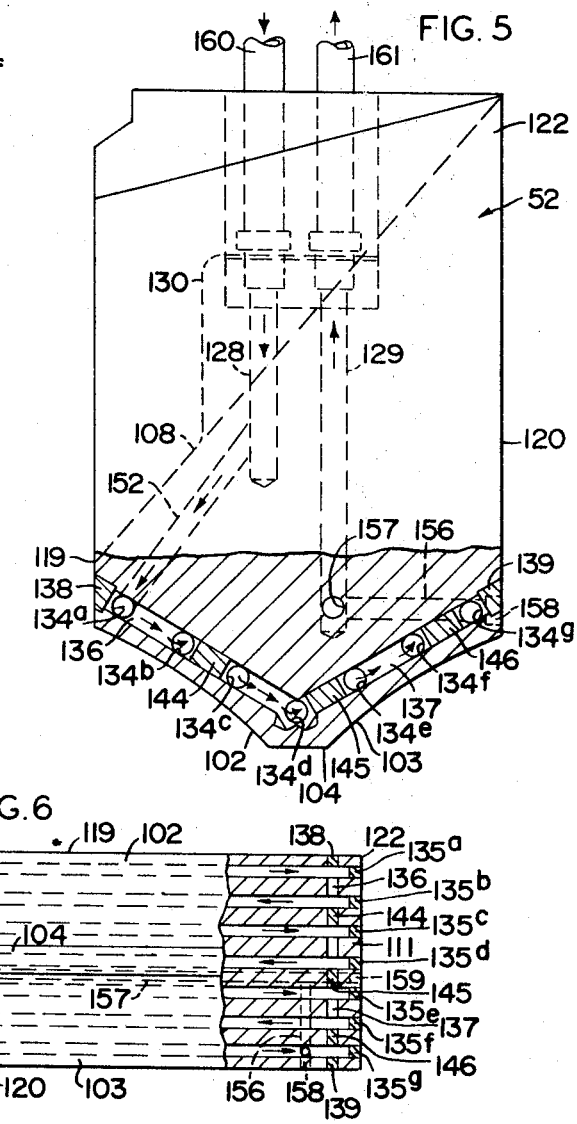
FIG. 5
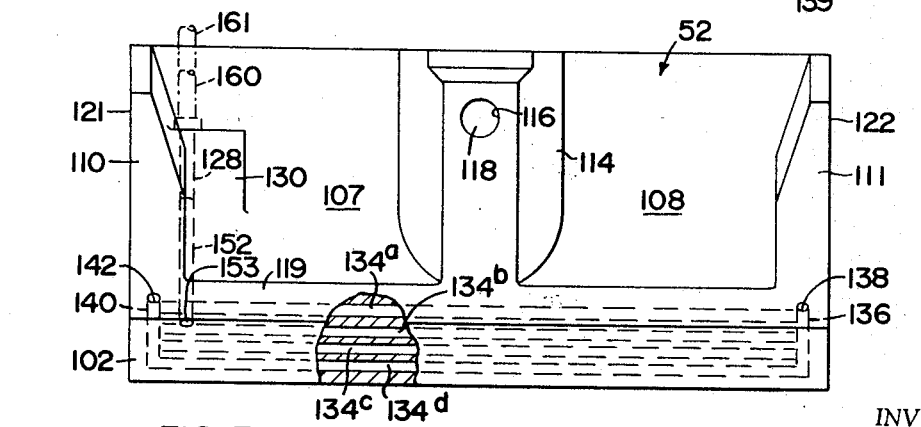
FIG. 6
FIG. 7
INVENTOR.
JAMES T. MATSUOKA
BY
Watts, Hoffmann, Fisher & Heinke
ATTORNEYS.

United States Patent Office 3,525,387
Patented Aug. 25, 1970

3,525,387
MIXING MACHINE
James T. Matsuoka, Brecksville, Ohio, assignor to Intercole Automation Inc., Cleveland, Ohio, a corporation of Ohio
Filed Dec. 10, 1968, Ser. No. 782,566
Int. Cl. F24h 3/00
U.S. Cl. 165—47   4 Claims

ABSTRACT OF THE DISCLOSURE

A machine for mixing rubber, plastic and the like in which throat plates and a floating closure at a charging opening to a mixing chamber are provided with drilled passageways beneath surfaces adjacent the mixing chamber for the circulation of heat exchange fluid to in part control the temperature of material within the mixer.

---

This invention relates to machines for mixing rubber or plastic materials and the like, constructed to provide improved temperature control through the circulation of heat exchange fluid in machine components.

Mixing machines for rubber, plastic and the like in which material to be mixed is charged into a mixing chamber, mixed by rotors within the chamber and then discharged, are well known. Typically, the temperature of the material being mixed is raised by mechanical working that is effected during mixing. While some increase in the temperature of the material during mixing is usually beneficial, it is desirable to have control over the temperature apart from that which can be obtained through changes of the mixing operation itself. A degree of independent control has been obtained by the circulation of heat exchange fluid in side members of such machines that in part form the mixing chamber and which are readily accessible to facilitate the conduits, connections and the like necessary to accommodate such circulation.

A present trend in the rubber and plastic industry is toward the use of higher powered mixers that generate substantially more heat within the material being mixed during operation than do present mixers. It is therefore especially important in such mixers that heat exchange fluid be circulated over as great an area adjacent the mixing chamber as possible and also that the heat transfer be extremely efficient. Heretofore, efficient cooling has not been obtained over the maximum possible area of the chamber because the chamber-forming walls or surfaces are comprised of various structural members, the smaller ones of which are difficult to effectively cool. Such members include the floating closure, which is vertically movable within a charging conduit and which in its lower position forms an upper part of the mixing chamber, and associated throat plates at opposite ends of the charging opening, which adjoin the floating closure in its lower position. Both the construction and the location of these members centrally within the machine have hindered effective temperature control.

It is an object of this invention to provide an improved mixer of the type referred to in which component parts internal to the mixer and which in part form an upper position of the mixing chamber of the mixer and close a charging opening thereof are provided with smooth-walled, series-connected, passages within and closely adjacent the surfaces of wall portions of said parts that partially form the mixing chamber.

It is another object of the present invention to provide an improved mixer of the type referred to in which heat exchange fluid can be circulated within throat plates at opposite ends of a charging opening to aid in providing maximum control of the temperature of material being mixed.

It is another object of this invention to provide an improved mixer of the type referred to in which elongated throat plates extend upward from opposite ends of a charging opening to provide uninterrupted guiding and sealing surfaces along a charging conduit for a vertically movable floating closure and which are provided with drilled passageways at lower end portions that are located adjacent to the closure when the closure is in a lowered position to provide for the circulation of heat exchange fluid and thereby aid in the temperature control of material being mixed.

It is another object of the invention to provide an improved mixer of the type referred to having a vertically movable floating closure for a charging opening at the top of the mixing chamber, which closure has two downwardly facing converging cylindrical surfaces that in part define the mixing chamber when the closure is in a lowered position, drilled passageways within the closure member closely adjacent to the cylindrical surfaces, including passageways extending parallel to the axis of each surface substantially the entire length thereof and connecting passageways extending transversely thereof, suitably plugged to establish series flow through said parallel conduits, and conduit means connecting the parallel passageways to a source of supply of heat exchange fluid and to exhaust.

It is another object of this invention to provide an improved mixing machine of the type referred to in which both a floating closure for the charging opening at the top of the mixing chamber and throat plates at opposite ends of the opening that adjoin the ends of the closure when it is in a lowered position are provided with passageways that are relatively small in diameter to avoid weakening the parts, that are accurately located to permit minimum spacing from major surfaces of the parts and that have smooth, machined, surfaces that reduce the resistance to the flow of heat exchange fluid therein.

Other objects, features and advantages of this invention will be apparent from the following detailed description, when considered in connection with the accompanying drawings forming a part of this specification, in which:

FIG. 2 is a partial transverse sectional view taken along the line 2—2 of FIG. 1;

FIG. 3 is a detailed front elevational view, with parts removed, of the charging conduit, floating weight and throat plates of the mixing machine as viewed approximately from the plane of line 3—3 of FIG. 2, with the floating weight in a lowered position;

FIG. 4 is a partial side elevational view, with parts in section, of the throat plate of FIG. 2 on an enlarged scale;

FIG. 5 is a detailed end view on an enlarged scale, of the floating weight of FIG. 3, partially in elevation and partially in section;

FIG. 6 is a bottom plan view of the floating weight of FIG. 5; and

FIG. 7 is a front elevational view of the floating weight of FIGS. 5 and 6.

Figure 1:
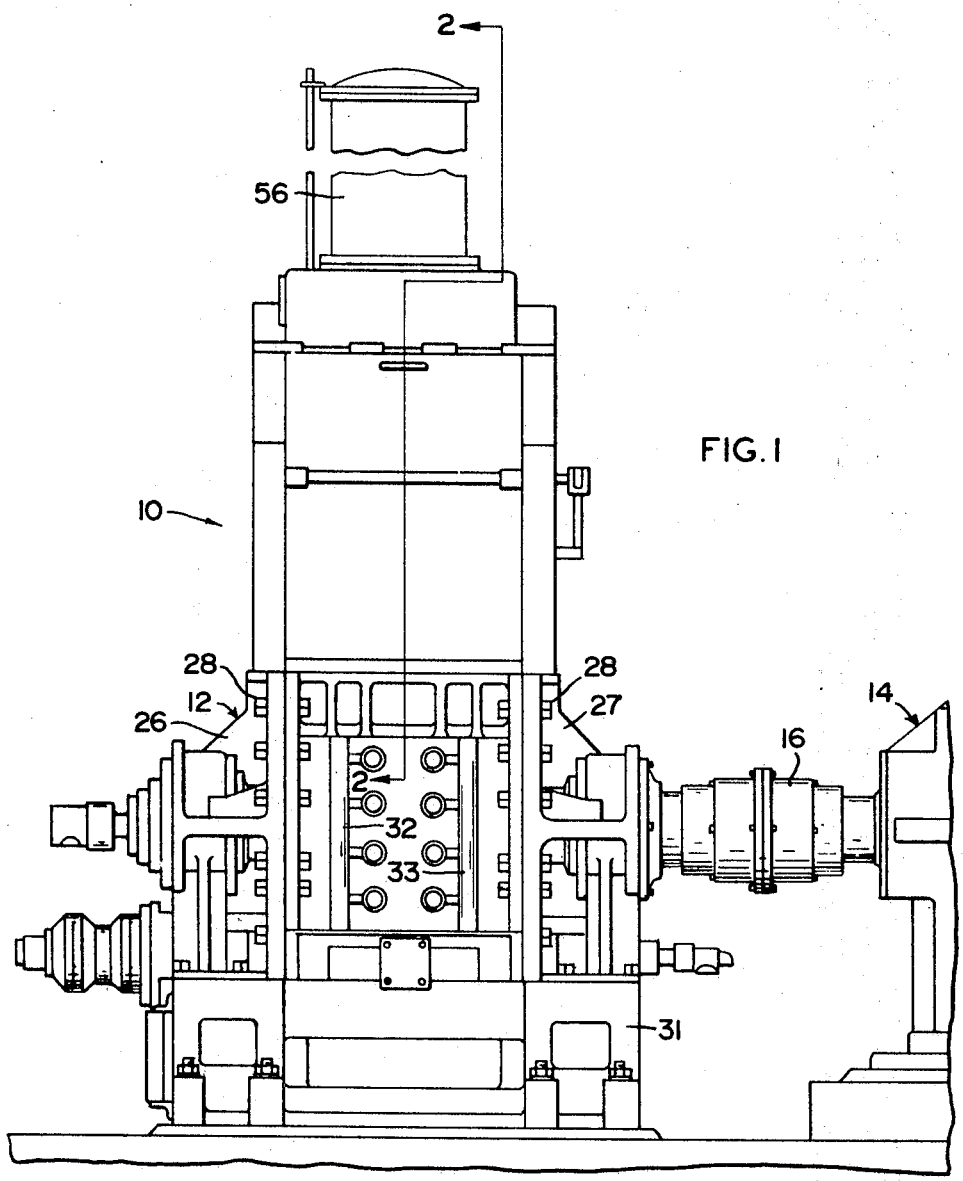
FIG. 1 is a partial side elevational view of a mixing machine embodying the present invention.

With reference to the drawings, a mixing machine embodying the present invention is indicated generally at 10 and includes a mixer 12 in which material such as rubber, plastic or the like is mixed by rotors. A drive unit 14, which is a motor driven gear reducer, is connected by couplings 16 to rotors of the mixer 12.

The mixer 12 includes a mixing chamber 18 (FIG. 2) in which side-by-side rotors 20, 21 are driven by the drive unit 14 to mix material contained within the chamber. The mixing chamber 18 is formed by side members 22, 23, which have concave inner walls 24, 25, respectively, and by end frames 26, 27 that are secured to the side members by suitable bolts 28. A suitable base 31 supports the side members and end frames. Headers 32, 33 associated with each side member 22, 23 supply heat exchange fluid to chambers 34 and passages 35 within the side members to control the temperature of the side members. An upper charging opening 37 and a lower discharge opening (not shown) to the chamber 18 provide for the introduction of the material to be mixed and the removal of mixed batches.

A vertical charging conduit 40 is directly above the charging opening 37 to the mixing chamber 18. The conduit 40 includes a lower section 42 in the frame structure of the mixer 12, immediately above and communicating with the mixing chamber 18, and an upper section or extension 44 which is a continuation of the lower section 42. A charging hopper 46 is mounted on the upper section or extension 44 and has a hopper door 48 and a loading opening 50 for admitting material to the charging hopper and ultimately to the mixing chamber 18.

A pressure ram or floating weight 52 is vertically slidable in the charging conduit 40. In a lower position it is located within the opening 37 in the mixing chamber 18 and serves as a closure for the opening. When raised to the upper position as shown in solid line in FIG. 2, a path is provided through the conduit 40 from the charging hopper 46 to the chamber 18 for charging material to be mixed. The floating weight 52 is connected to the lower end of a piston rod 54, the upper end of which is connected to a piston within a fluid cylinder 56 mounted on top of the hopper 46. Actuation of the piston rod 54 by the cylinder and piston moves the floating weight 52 between an upper position adjacent the loading opening 50 and a lower position within the opening 37 of the mixing chamber, at the lower end of the charging conduit. Downward movement of the floating weight 52 applies pressure to material being introduced into the mixing chamber 18.

The charging conduit 40 is generally rectangular in plan, extending longitudinally substantially the length of the mixing chamber 18 at the upper, central, portion thereof, where the chamber walls 24, 25 would otherwise converge. Two throat plates 60, 61 are provided, one at each end of the opening 37, extending upward from the opening along each narrow side of the charging conduit 40. The throat plates serve to guide and form a close seal with end surfaces of the floating weight 52 when it is in the lower position closing the chamber 18. Preferably, as shown, the throat plates 60, 61 extend the length of the charging conduit 40 up to the charging hopper 46 to provide an uninterrupted guide surface and seal with the floating weight up to the loading opening 50. Alternatively, the throat plates can terminate at the upper edge of the lowered section 42 and a separate plate can be provided aligned with each throat plate to extend along the upper section or extension 44. However, such an arrangement is not as advantageous as a continuous throat plate because the horizontal split or joint between the two separate plates can interfere with movement of the weight, should there be any misalignment in the position of the plates.

Each throat plate 60, 61 is a mirror image of the other and only one need be described in detail. The throat plate 60 is relatively thin and narrow as shown in FIGS. 2 and 3, generally rectangular in shape except for the lower portion, which is formed of two cylindrical surfaces 62, 63 (FIG. 4) that extend from longitudinal sides 64, 65, respectively and which converge downwardly, joining at an apex 68. The longitudinal sides 64, 65 fit tightly between the opposite sides 42a, 42b of the lower section 42 and between the opposite sides 44a, 44b of the upper section 44 of the charging conduit 40. A top or end surface 69 is perpendicular to the longitudinal sides and terminates flush with the lower end of the charging hopper 46. Blind, tapped, apertures 70 in an outwardly facing surface 71 of the plate receive screws that extend through the walls of the upper and lower sections of the charging conduit to secure the plate within the conduit.

As best shown in FIG. 4, a plurality of drilled parallel passageways 72 extend longitudinally within the throat plate 60, upward from the lower cylindrical surfaces 62, 63, parallel to the side surfaces 64, 65. Although the throat plate 60 is relatively thin, drilled passageways can be accurately located close to the surfaces of the throat plate to maximize heat transfer through the plate to fluid flowing through the drilled passageways. Also, because the passageways are drilled, they have a smooth machined surface, which minimizes their resistance to the flow of fluid.

In the preferred embodiment shown, three parallel passageways 72a, b, c extend upward from the surface 62 and three parallel passageways 72d, e, f extend upward from the surface 63. These passageways extend a distance approximately equal to the height of the floating weight 52 so as to cool that portion of the throat plate that is adjacent the lower surfaces 62, 63 and contiguous with the floating weight when the weight is in a lower position, sealing the charging opening 37. Each of the passageways 72 are blind holes that are closed at the open ends at the surfaces 62, 63 by plugs 73a, b, c, d, e, f.

Two transverse blind passageways 75, 76 extend inwardly from the longitudinal side surfaces 64, 65 adjacent the blind ends of the passageways 72. The transverse passageway 75 connects the parallel passageways 72a, b, c and the transverse passageway 76 connects the parallel passageways 72d, e, f. Additional transverse passageways are formed adjacent the curved surfaces 62, 63 connecting the lower ends of the parallel passageways 72. Thus, a transverse passageway 78 extends inwardly from the side surface 64 and connects passageways 72a, b. A similar passageway 79, from the opposite side surface 65 connects the lower ends of the parallel passageway 72e, f. The lower ends of the passageways 72c, d, are connected by intersecting transverse passageways 80, 81. Plugs 85, 86 close the open ends of transverse passageways 75, 76; plugs 88, 89 close passageways 78, 79; and plugs 90, 91 close passageways 80, 81 to isolate the conduits from the edge surfaces 62, 63, 64, 65 of the throat plate. In addition, an internal plug 93 is located within the transverse passageway 75, between the parallel passageways 72a, 72b and an internal plug 94 is located in the transvserse passageway 76, between the parallel passageways 72e, 72f. An inlet port 96 and an exhaust port 98 communicate through the outwardly facing side surface 71 to the parallel passageways 72a, 72f respectively. As shown by the flow arrows in FIG. 4, the transverse passageways and plugs 93, 94 establish a series flow through the parallel passageways 72a–f from the inlet port 96 to the exhaust port 98. Not only is the flow located throughout the lower portion of the throat plate, but it is also directed closely adjacent the curved surfaces 62, 63 to assure maximum heat transfer adjacent the mixing chamber 18.

The floating weight 52 is a block-like affair, as best shown in FIGS. 5 to 7, generally elongated in the direction the rotors extend, so as to close the charging opening 37 when in a lowered position. The lower side of the weight includes a pair of concave cylindrical surfaces 102, 103 and a flat apex 104 between the cylindrical surfaces. The cylindrical surfaces and apex form a portion of the mixing chamber wall when the floating weight is in a lower position. Front surface portions 107, 108 of the weight 52 slope rearwardly in an upward direction. End portions 110, 111 of the weight and a center portion 114 project upward beyond the sloping surfaces 107, 198. A transverse through-bore 116 at the upper end of the center portion 114 receives a connecting pin 118, which connects the floating weight to the lower end of the piston rod 54, which is received in a recess in the center portion 114. A front surface 119 and a rear surface 120 extend the length of the floating weight and slidably engage the interior surfaces 42a, 44a and 42b, 44b, respectively, of the charging conduit 40, in generally sealing relationship. Side surfaces 121, 122 of the end portions 110, 111 are planar and slide along inwardly facing surfaces 123 of the throat plates 60, 61 in generally sealing relationship.

The temperature of the floating weight, and especially the cylindrical surfaces 102, 103 and the apex surface 104 is controlled by the circulation of heat exchange fluid through parallel longitudinally extending drilled passageways 134 that are closely adjacent the said surfaces and provided with smooth, machined inner surfaces to reduce the resistance to flow of heat exchange fluid through passageways. As shown in FIG. 5, seven parallel passageways 134a–g are provided in the embodiment shown. The parallel passageways 134 are drilled from the surface 122 of the end portion 111 and are blind holes, terminating within the end portion 110. The open ends in the surface 122 of the end portion 111 are plugged. Plugs 135a–g are provided in the open ends of the passageways 134a–g, respectively. Two transverse passageways are drilled in each end portion of the floating weight from the front and back surfaces connecting the ends of the parallel passageways 134. Thus, as shown in FIGS. 5 and 6, a passageway 136 in the end portion 111 extends from the front surface 119 through passageways 134a, b, c and terminates in passageway 134d. A transverse passageway 137 extends from the rear surface 120 through the ends of parallel passageways 134g, f, e and terminates in passageway 134d preferably in the same vertical plane as the passageway 136. Plugs 138, 139 close the outer ends of passageways 136, 137, respectively. Similar passageways 140, 141 (FIG. 6) are provided in the other end portion 110, plugged at surfaces 119, 120, respectively, by end plugs 142, 143. An intermediate plug 144 is located within the transverse passageway 136, between the parallel passageways 134b and 134c. Two intermediate plugs 145, 146 are located within the transverse passageway 137, the plug 145 being between parallel passageways 134d and 134e and the plug 146 being between the parallel passageways 134f and 134g. Intermediate plugs 147, 148 are located in transverse passageway 140, between parallel passageways 134a, 134b and 134c, 134d, respectively, and intermediate plug 149 is located in the passageway 141, between the parallel passageways 134e and 134f. As will be evident from FIGS. 5 and 6, the locations of these intermediate plugs establish series flow through the parallel passageways and the connecting transverse passageways so that a flow introduced to the passageway 134a adjacent the end portion 110 will travel successively through each parallel passageway to the passageway 134g adjacent the opposite end portion 111 of the floating weight.

The end of parallel conduit 134a that is located in the end portion 110 of the floating weight is connected to a vertical inlet conduit 128 in a boss 130 by a drilled passageway 152 that extends from the cylindrical surface 102 beneath the sloping front surface portion 107 in a transverse vertical plan of the floating weight that includes the inlet conduit 128. The passageway 152 intersects both the parallel passageway 134a and the conduit 128. The passageway 152 terminates at the conduit 128 and is closed by a plug 153 at its open end in the cylindrical surface 102. The end of the parallel passageway 134g adjacent the end portion 111 of the weight is connected to a vertical discharge conduit 129 in the boss 130 by a transverse passageway 156 and a longitudinal passageway 157. The passageway 156 extends through the back surfaces 120 to the passageway 157 and is closed at the back surface by a plug 158. The passageway 157 extends through the side wall 122 to the conduit 129 and is closed at the side wall by a plug 159. Inlet and outlet pipes 160, 161, respectively, connect to the inlet and outlet conduits 128, 129, extend vertically through the charging conduit 40, and are movable with the floating weight 52. They are connected at their upper ends to a source of supply and exhaust for heat transfer fluid.

The manner in which the floating weight 52 and the throat plates 60 are connected to sources of heat exchange fluid is best shown in FIG. 3. The inlet pipe 160 of the weight 52 is connected to a vertical extension 164 in the charging hopper. The vertical extension is connected outside the apparatus of a source of heat transfer fluid. A similar pipe 165 extends from the outlet pipe 161 of the weight.

Fluid is supplied to and returned from each throat plate 60, 61 through two parallel pipes 170, 171 that extend generally perpendicular to the throat plate, outwardly therefrom, and are connected to a source of fluid supply and a reservoir, respectively. The inlet pipe 170 is connected to the inlet port 96 and the exhaust pipe 170 is connected to the exhaust port 98.

In operation, heat transfer fluid is supplied to each of the throat plates 60, 61 through respective inlet pipes 170 and circulated in the lower portion of each plate, through the parallel passageways 72 and connecting passageways to cool the lower surface portions of the throat plates that are positioned adjacent the floating weight 52 when the weight is in the lower position, as shown in FIG. 3. Heat exchange fluid is circulated through the floating weight 52 through the parallel drilled passageways 134 closely adjacent to the concave cylindrical surfaces 102, 103 and the apex surface 104 that in part form a part of the mixing chamber. The temperature control of the throat plates and floating weight, as effected by circulation of heat transfer fluid, such as cooling water, closed to the surfaces, has a significant effect upon the temperature of the material within the mixing chamber because the surface areas that are controlled constitute a substantial portion of the chamber wall area and because the heat transfer is extremely efficient. The high efficiency is due both to the proximity of the passageways for heat transfer fluid to the surfaces of the parts and to the relatively high velocity flow that can be obtained through the passageways. The high velocity flow is possible, notwithstanding the relatively small diameter of the passageways necessitated by their close location to the surfaces and their presence in relatively thin walled portions of the machine components, because of the smooth inner walls.

From the foregoing description and the accompanying drawings it will now be apparent that this invention provides a novel construction for a mixing machine in which heat exchange fluid can be circulated with high efficiency within throat plates at opposite ends of a charging opening and through passageways closely adjacent to concave surfaces of a floating weight that in part form the mixing chamber of the machine. The construction and arrangement provides substantial control of the temperature of the material being mixed and thereby facilitates the use of higher powered mixing machines which generate substantial heat within the material during mixing.

Although the present invention has been described with particularity, it will be understood that various modifications and alterations may be made therein without departing from the spirit and scope of the invention.

What is claimed is:

1. In apparatus for mixing rubber, plastic and the like, housing means providing a mixing chamber with a charging opening at the top of the chamber, an upright charging conduit communicating with the mixing chamber through said opening, a vertically movable floating closure for said opening, said closure having two downwardly facing cylindrical surfaces that extend axially in a direction along the charging opening and converge in a downward direction and which in part define the mixing chamber when the closure member is received in said opening, two spaced throat plates at opposite ends of said opening, above the chamber and at the bottom of said charging conduit adapted to adjoin end surfaces of said closure when the closure is in a lowered position adjacent the top of the chamber, said throat plates being thin relative to their length and width and each terminating at a lower end in two converging surfaces, a plurality of drilled passageways communicating with each other to form a series-flow path within each of said throat plates adjacent said lower end beneath a surface that adjoins the closure when the closure is in a lowered position, and means to supply and exhaust heat exchange fluid to and from the passageways of each throat plate to control the temperature thereof.

2. In apparatus for mixing rubber, plastic and the like, housing means providing a mixing chamber with a charging opening at the top of the chamber, an upright charging conduit communicating with the mixing chamber through said opening, a vertically movable floating closure for said opening, said closure having two downwardly facing cylindrical surfaces that extend axially in a direction along the charging opening and converge in a downward direction and which in part define the mixing chamber when the closure member is received in said opening, two spaced throat plates at opposite ends of said opening, above the chamber and at the bottom of said charging conduit adapted to adjoin end surfaces of said closure when the closure is in a lowered position adjacent the top of the chamber, said throat plates being thin relative to their length and width and each terminating at a lower end in two converging surfaces, a plurality of drilled passageways communicating with each other to form a series-flow path within each of said throat plates adjacent said lower end beneath a surface at a location that adjoins the closure when the closure is in a lowered position, means to supply and exhaust heat exchange fluid to and from the passageways of each throat plate to control the temperature thereof, drilled parallel passageways within said floating closure closely adjacent to said cylindrical surfaces, and extending axially thereof, passageways serially interconnecting said drilled parallel passageways within said floating closure, and fluid supply means connected to an upper portion of said floating closure communicating with said drilled parallel passageways therein and movable vertically with said closure.

3. In apparatus for mixing rubber, plastic and the like, housing means providing a mixing chamber with a charging opening at the top of the chamber, an upright charging conduit communicating with the mixing chamber through said opening, a hopper adjacent an upper portion of said charging conduit for receiving material to be charged into said chamber, a vertically movable floating closure for said opening, said closure having two downwardly facing cylindrical surfaces that extend axially in a direction along the charging opening and converge in a downward direction and which in part define the mixing chamber when the closure member is received in said opening, two spaced throat plates at opposite ends of said opening, above the chamber and at the bottom of said charging conduit adapted to adjoin end surfaces of said closure when the closure is in a lowered position adjacent the top of the chamber, said throat plates each extending continuously upward along opposite sides of said charging conduit to said hopper for providing an uninterrupted guiding and sealing surface for said closure within the charging conduit between the mixing chamber and hopper, said throat plates being thin relative to their length and width and each terminating at a lower end in two converging surfaces, a plurality of drilled passageways communicating with each other to form a series-flow path within each of said throat plates at locations that are adjacent opposite ends of the closure when the closure is in a lowered position, and means to supply and exhaust heat exchange fluid to and from the passageways of each throat plate to control the temperature thereof.

4. In apparatus for mixing rubber, plastic and the like, housing means provided a mixing chamber with a charging opening at the top of the chamber, an upright charging conduit communicating with the mixing chamber through said opening, a vertically movable floating closure for said opening, said closure having two downwardly facing cylindrical surfaces that extend axially in a direction along the charging opening and converge in a downward direction and which in part define the mixing chamber when the closure member is received in said opening, drilled parallel passageways within said closure member closely adjacent to said cylindrical surfaces and extending axially thereof substantially the entire length of said surfaces, passageways within said closure extending transversely of said parallel passageways interconnecting said parallel passageways, plugs in said interconnecting transverse passageways to limit flow through said parallel and interconnecting passageway to a continuous path that extends sequentially through adjacent parallel passageways, conduit means connecting a parallel passageway forming one end of said continuous path to an inlet port and another parallel passageway forming an opposite end of said continuous path to an outlet port in said closure, and supply conduits extending upward from the ports within said charging conduit and movable vertically with said closure to supply and exhaust heat exchange fluid to and from said parallel passageways.

References Cited

UNITED STATES PATENTS

| 1,122,670 | 12/1914 | Van Houten | 165—73 |
| 2,861,715 | 11/1958 | Wissmiller et al. | 165—73 |
| 2,854,223 | 9/1918 | Lee | 165—77 |

ROBERT A. O'LEARY, Primary Examiner

C. SUKALO, Assistant Examiner

U.S. Cl. X.R.
165—73, 86; 259—21